United States Patent [19]

Demers et al.

[11] 4,162,750

[45] Jul. 31, 1979

[54] MEASURING AND DISPENSING APPARATUS

[76] Inventors: Normand Demers, 126 Sherbrooke St., Thetford Mines; Claude Martin, R.R. No. 2, Garthby, both of Canada

[21] Appl. No.: 834,485

[22] Filed: Sep. 19, 1977

[51] Int. Cl.² ...................... G01F 11/06; F01L 25/08
[52] U.S. Cl. ..................................... 222/250; 91/275
[58] Field of Search ............... 222/249, 250; 91/275; 137/625.23, 625.22; 251/175, 192; 141/367

[56] References Cited

U.S. PATENT DOCUMENTS

| | | | |
|---|---|---|---|
| 825,370 | 7/1906 | Zurbuch | 137/625.23 |
| 2,074,543 | 3/1937 | Feaster | 91/275 X |
| 2,462,571 | 2/1949 | Thompson et al. | 91/275 |
| 2,755,966 | 7/1956 | Lindars | 222/250 X |
| 2,945,668 | 7/1960 | Staller et al. | 251/175 |
| 3,769,881 | 11/1973 | Aoki | 91/275 X |
| 4,031,918 | 6/1977 | Cagle | 137/625.23 |

Primary Examiner—David A. Scherbel
Assistant Examiner—Edward M. Wacyra

[57] ABSTRACT

An apparatus for automatically dispensing a measured volume of liquid has a cylinder and a piston. The liquid is fed to one end of the cylinder and displaces the piston which expels from the other end of the cylinder a quantity of liquid proportional to the piston stroke. At the end of the stroke, the piston abuts and closes a switch which actuates an electric motor driving a four-way rotary valve to reverse the liquid flow direction in the cylinder, whereby the piston moves in the opposite direction to discharge a measured amount of the liquid which was previously used to push the piston. The piston, at the end of its second stroke, again strikes and causes the closing of a second electric switch which produces rotation of the four-way valve to again reverse the liquid flow to its original direction.

6 Claims, 9 Drawing Figures

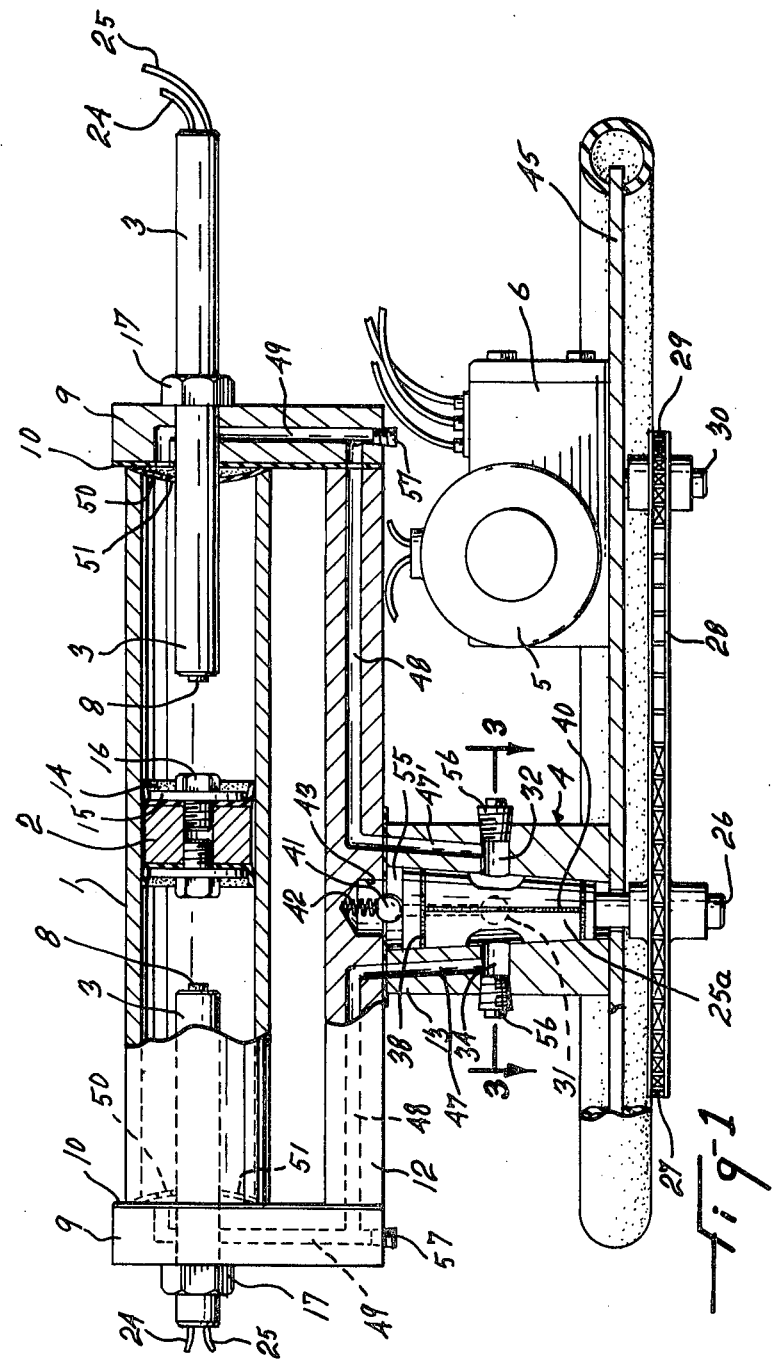

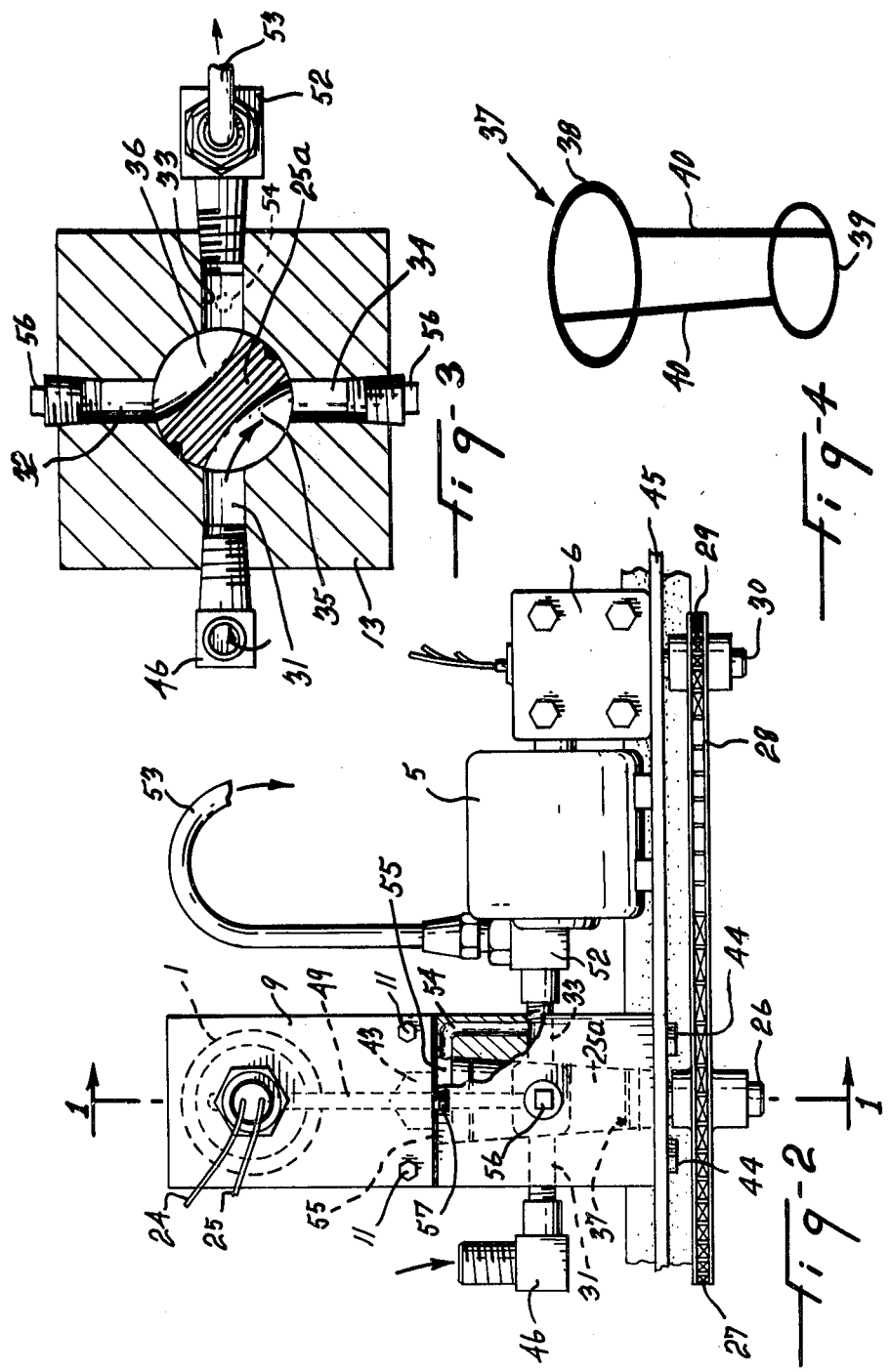

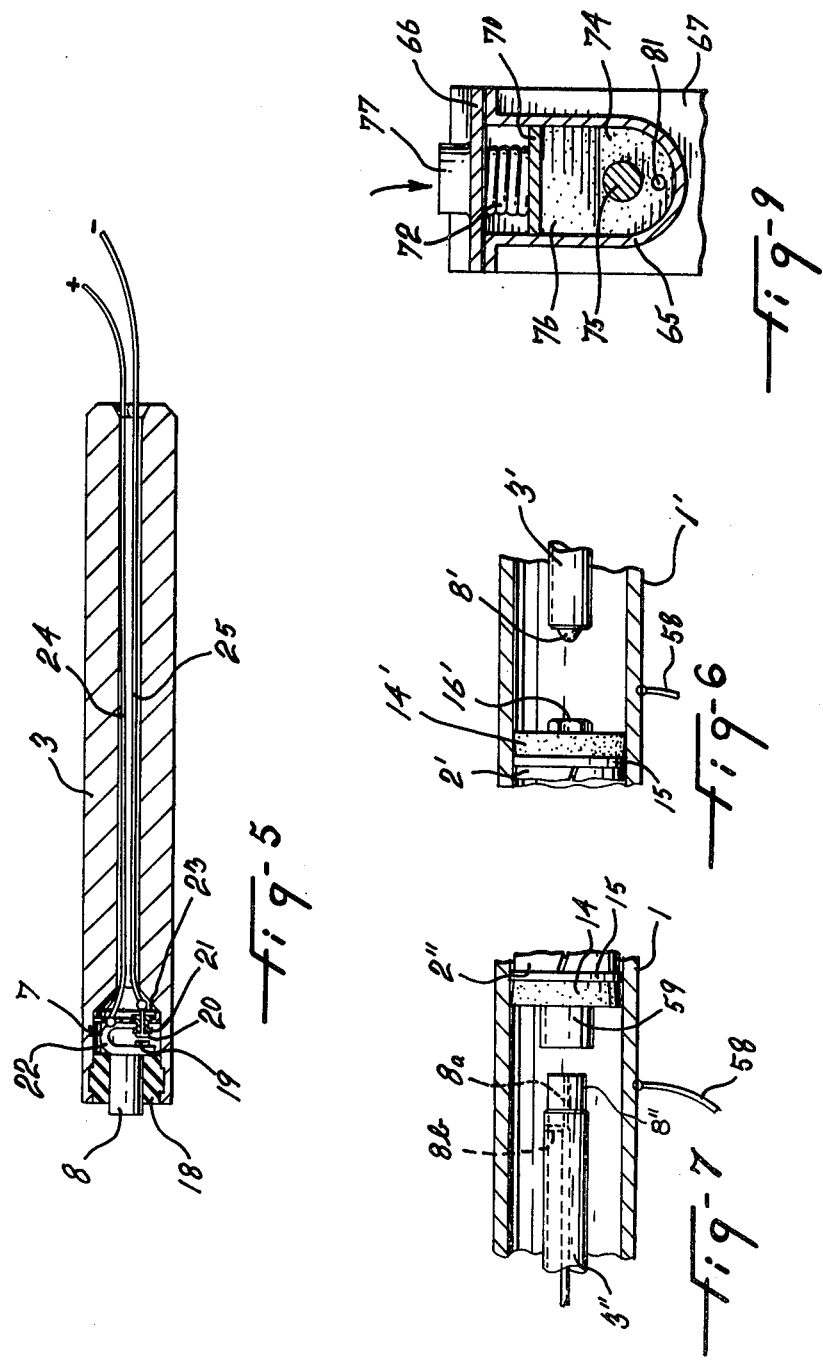

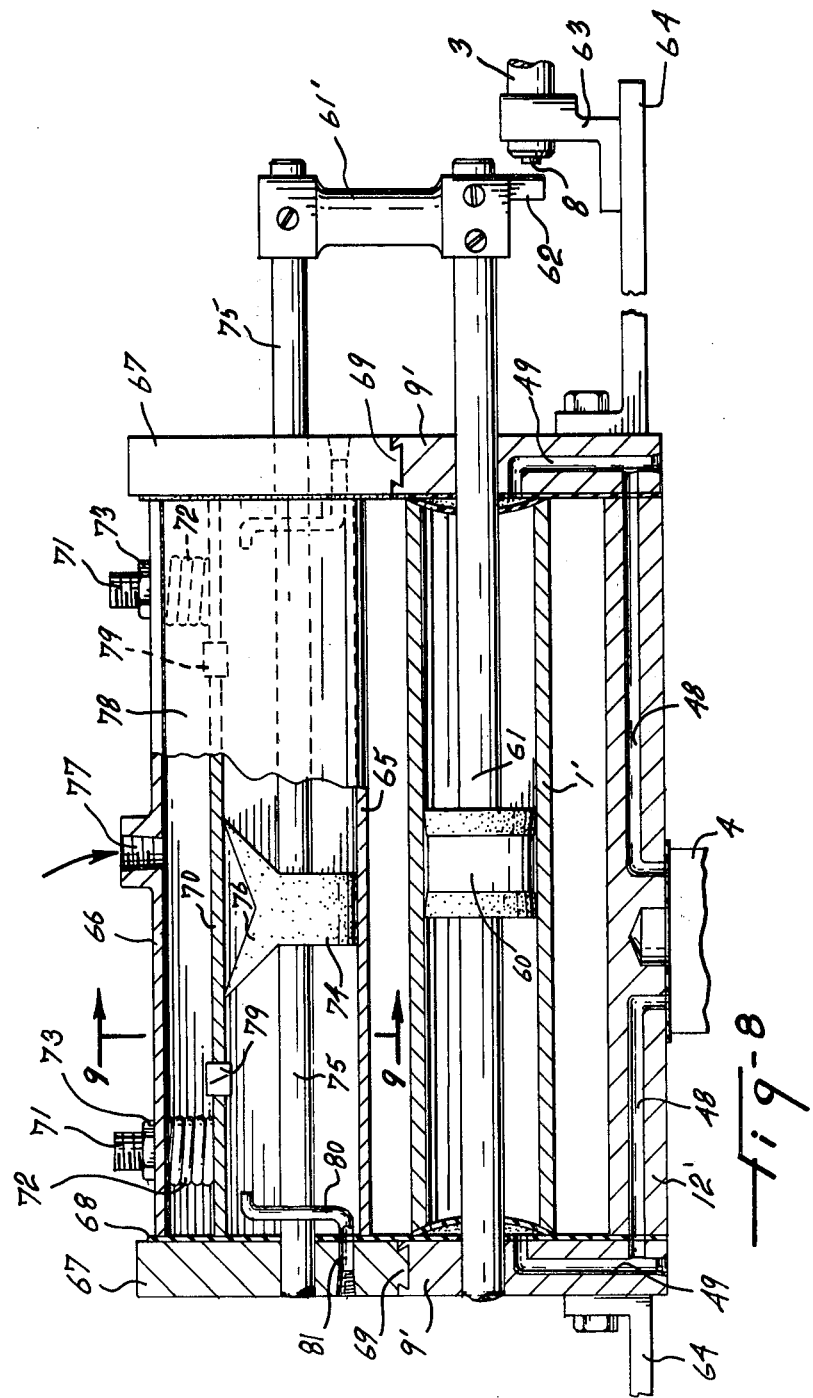

MEASURING AND DISPENSING APPARATUS

The present invention relates to an apparatus for dispensing measured volumes of liquid of the type including a cylinder filled with the liquid to be measured and having a piston which separates the liquid in two portions; the liquid on one side of the piston is used to push the latter to expel a measured amount of the liquid on the other side of the piston; the apparatus includes a four-way valve which reverses the liquid flow upon the piston reaching each of its two limit positions.

Known measuring apparatus of this type lacks in precision, especially when the liquid is at high pressure.

The main object of the invention is to provide an apparatus of the character described, which has a very high precision irrespective of the pressure of the liquid to be measured and dispensed in that the stroke of the measuring and dispensing piston is precisely set because the piston strokes stop at the ends of its strokes. Also, means are provided to positively prevent leakage around the piston and around the valve member of the four-way valve.

Another object of the invention is to provide switching means at the stops, which are electrically insulated from the cylinder and piston themselves, so that the apparatus can handle inflammable and otherwise dangerous liquids.

Another object of the invention is to provide a more simple embodiment in which the piston and the stop act as the two contacts of an electrical switch. This embodiment is suitable for use with non-flammable liquids.

Another object is to provide an apparatus of the character described, which acts as a proportioning meter for dispensing proportionate measured amounts of two or more liquids.

Another object of the invention is to provide an apparatus of the character described, in which shock-absorbing means are provided at the stops to diminish the impact of the piston thereon and consequently reduce the noise made by the apparatus.

The foregoing and other objects of the invention will become more apparent during the following disclosure and by referring to the drawings, in which:

FIG. 1 is a longitudinal section, taken along line 1—1 of FIG. 2 of a first embodiment of the measuring and dispensing apparatus of the invention;

FIG. 2 is an end view of the same;

FIG. 3 is a cross-section of the four-way valve taken through line 3—3 of FIG. 1;

FIG. 4 is a perspective view of the sealing gasket used in the four-way valve;

FIG. 5 is a longitudinal section of one of the stop rods and electrical switch used in the embodiment of FIG. 1;

FIG. 6 is a partial longitudinal section of the measuring chamber and another embodiment of one of the stop rods;

FIG. 7 is a view similar to that of FIG. 6 but showing still another embodiment of the stop rod and floating piston;

FIG. 8 is a longitudinal section of another embodiment of the measuring apparatus providing a multiplicity of measuring and dispensing chambers; and FIG. 9 is a cross-section, taken along line 9—9 of FIG. 8.

In the drawings, like reference numerals indicate like elements throughout.

As shown in FIGS. 1 and 3, the apparatus of the first embodiment comprises an elongated tubular member in the form of a cylinder 1 in which is located a floating piston 2, movable back and forth between stop rods 3. A liquid circuit for cylinder 1 includes a four-way valve 4 actuated in rotation by an electric motor 5 and a speed reducer 6. The motor 5 is controlled through an electrical circuit, not shown, by a pair of switches 7 (see FIG. 5) carried within the stop rods 3 and alternately closing upon abutment of the floating piston 2 on a stop piece 8, carried by the inner end of the stop rod.

Cylinder 1 is closed at both ends by head plates 9 with the intermediary of sealing gaskets 10. Head plates 9 are secured together by means of tie rods and nuts, as shown at 11 in FIG. 2. The head plates 9 also support a plate 12 to which is secured the valve body 13 of four-way valve 4.

The floating piston 2 consists of a cylindrical block, to the opposite face of which is secured a sealing ring 14 held in position by a washer 15 and a bolt 16 screwed within the block 2. The sealing ring 14 effectively prevents the liquid flowing past the piston from one side or the other.

Each stop rod 3 is carried by a respective head plate 9 in coaxial relationship with cylinder 1 and extends inwardly within the latter towards the floating piston 2. Each stop rod 3 is screwed in head plate 9 so as to be longitudinally adjustably positioned in cylinder 1. Once adjusted, it is fixed by a lock nut 17. The head of the bolt 16 of the floating piston 2, on each side of the piston, is adapted to come in direct abutment with the stop piece 8 of the associated stop rod 3 at the end of a stroke of the floating piston.

As shown in FIG. 5, the stop piece 8 is carried by the inner end of the stop rod 3 through the intermediary of an elastic sleeve 18, which holds the stop piece 8 in position but allows limited longitudinal displacement of the latter with respect to the stop rod 3. Inward displacement of the stop piece 8 causes closing of the switch contacts 19 and 20 of the electrical switch 7. The contact 20 is electrically insulated by means of insulation 21. The two contacts 19, 20 are carried in opposite relationship by the two ends of a resilient U-shape element 22, normally maintaining the two contacts spaced apart. One of the legs is fixed in position within a cavity of the stop rod 3 by means of a bracket 23, while the leg carrying contact 19 abuts against stop piece 8.

Wires 24, 25 are connected to U-shape member 22 and to contact 20, respectively. These wires freely extend through a central bore of the stop rod to be connected into the electrical circuit of the electric motor 5. The two stop rods 3 are identical in construction.

The switches 7 are connected in parallel and in turn series connected in the supply circuit of the electric motor 7 so that each time one of the switches 7 is closed, the electric motor will rotate in one direction until closed switch 7 opens again. Then the motor will stop and will start again upon closing of an alternate switch 7.

The valve stem 25a of four-way rotary valve 4 is rotated by its shaft 26 on which is secured a sprocket 27 driven in rotation by a chain 28 trained on the sprocket 27 and also on a sprocket 29 secured to the output shaft 30 of the speed reducer 6, driven by motor 5.

The valve body 13 consists of a block of square cross-section, as shown in FIG. 3, provided with four bores 31, 32, 33, 34, respectively, disposed at the same level and at right angles to each other.

The valve stem 25a is provided with two opposite grooves 35 and 36 at the level of the bores 31 to 34. The grooves 35 and 36 are transverse to the stem at the periphery thereof and are so shaped that they establish communication with any two adjacent bores 31 to 34. For instance, in the position of the valve stem 25a shown in FIG. 3, groove 35 makes communication between bores 31 and 34, while groove 36 makes communication between bores 32 and 33.

Rotation of the valve stem through one-quarter turn clockwise from the position of FIG. 3 will make communication between bores 31 and 32 on the one hand, and 33 and 34 on the other hand.

Valve stem 25a is fitted with a gasket 37, shown in FIG. 4 and also in FIGS. 1 and 3. This gasket includes upper and lower rings 38 and 39 transversely surrounding the valve stem, being positioned in grooves thereof above and below the bores 31 and 34, and longitudinally extending legs 40 connected to the rings 38 and 39 and diametrically opposite to each other, being inserted within suitable longitudinal grooves of the valve stem. The rings 38, 39 prevent leakage of the fluid at the outer ends of the valve stem while legs 40 prevent leakage from the high pressure to the low pressure side of valve stem 25a.

In order to always prevent valve leakage despite its wear, the valve stem is frusto-conically shaped, as shown in FIG. 1, and seats within a frusto-conical shape bore of the valve body 13. Moreover, the stem is loaded into seating engagement by liquid under pressure as hereinafter described and by a ball 41 pressed against the valve stem by compression coil spring 42 bearing against the bottom of a recess 43 made in the plate 12.

The valve body 13 is rigidly secured underneath the plate 12 by means of tie bolts 44 passing through bores made in the valve body 13, as shown in FIG. 2. These tie bolts also assemble the valve 4 and the cylinder assembly 1 on top of a base plate 45, serving also to carry the motor 5 and speed reducer unit assembly 6.

The liquid to be measured comes from a supply under pressure, not shown, through a connection 46 into the bore 31. The liquid under pressure can either pass to bore 32 or to bore 34, depending on the angular position of the valve stem 25a. In the position shown in FIG. 3 the the liquid under pressure enters bore 34, then bore 47 communicating therewith; then bore 48 extending through the plate 12; then bore 49 extending through the left-hand head plate 9. Bore 49 opens at the top portion of the cylinder 1 at one end thereof and the liquid is discharged within the chamber formed in cylinder on the left-hand side of the floating piston 2.

The liquid discharged within cylinder 1 must pass through an opening 50 of a cut-shaped annular member 51 surrounding stop rod 3 and secured between the end of cylinder 1 and head plate 9. Opening 50 is disposed near the top of the cylinder 1 and, therefore, any gas which may accumulate in the cylinder will be expelled during the liquid discharge stroke of the piston 2.

The liquid discharged within the cylinder 1 at the left-hand side of piston 2 will move this piston to the right, causing discharge of the liquid at the right of the piston through right-hand side top opening 50 of cup-shaped member 51, then through bore 49 of the right-hand side head plate 9, then through bore 48 on the right-hand side of plate 12 and through bore 47' made in valve body 13 and in communication with bore 32. The liquid then passes through groove 36 of the valve stem 25a and through bore 33 to be discharged to the exterior through elbow 52 and discharge tube 53. The pressure of the liquid in the discharge bore 33 is used to exert a further downward pressure on the valve stem 25a to maintain the same in fluid-tight engagement with the valve body. To this end, by-pass bore 54 connects with bore 33 and extends upwardly through the valve body 13 to open within a chamber 55 on top of the valve stem 25a (see FIGS. 2 and 3). When no liquid is discharged through bore 33, there is no downward pressure on valve body 13 and the latter can rotate freely.

Bores 32 and 34 are plugged at their outer ends by threaded plugs 56. Similarly, the outer ends of bores 49 in the head plates 9 are plugged by means of threaded plugs 57. The apparatus operates as follows:

The two stop rods 3 are longitudinally adjusted by unscrewing the same in their respective head plates 9, so as to obtain the exact spacing between the stop pieces 8 to obtain a desired volume of discharged liquid for each stroke of the piston 2. Once the rods are threaded within the head plate, the lock nuts 17 are screwed in position. At this start, the floating piston 2 is at either one of its limit strokes abutting either one of stop pieces 8.

Supposing floating piston abuts left-hand side stop piece 8, then the valve stem is in the position shown in FIG. 3. The cylinder 1 is filled with liquid. Liquid under pressure discharged in the left-hand side chamber 1 will cause movement of the piston 2 towards the right and, consequently, discharge of the liquid in the right-hand side chamber of the cylinder through the discharge tube 53. This discharge will continue until piston 2 abuts right hand side stop piece 8, thereby closing the switch 7 associated with the latter. The supply circuit of motor 5 is thus closed by last named switch 7 and immediately starts operating, causing rotation of the valve stem one-quarter turn, until the liquid flow is reversed, that is the liquid supply is connected with the right-hand side chamber of the cylinder 1, while the left-hand side chamber is connected with the discharge tube 53. The floating piston 2 then starts to move towards the left thereby opening right-hand switch 7 which stops motor 5 and valve rotation. Piston 2 continues its movement to the left until it abuts the left-hand side stop piece 8, closing the switch 7 associated therewith. The motor 5 starts again in the same direction of rotation, causing a further rotation of the valve stem through one-quarter turn thus again reversing the liquid flow and the cycle is repeated. Thus, it will be appreciated that at each stroke, a measured amount of liquid is discharged which is rigorously the same as the amount of liquid discharged in the previous stroke.

In the embodiment just described, the electrical switches 7 are completely electrically insulated from the liquid and, therefore, inflammable and otherwise dangerous liquids can be measured and dispensed from the apparatus. The apparatus can measure and dispense a liquid which is at very high pressure in a precise manner, since there is no leakage around valve stem 25 from the supply circuit to the discharge circuit. Also, the apparatus can measure and dispense liquids of various viscosities.

Whenever a non-dangerous liquid is used, the embodiments of FIG. 6 or 7 can be used. In the embodiment of FIG. 6, cylinder 1' is made of metal and is part of the electrical circuit, being connected by wire 58 into said circuit. The stop rod 3' is electrically insulated from cylinder 1' and has a half-spherical metallic stop piece 8' which serves as one contact of the electrical switch as well as a stop member, the other contact of the electrical switch being the bolt 16' of the floating piston 2' the latter having a metallic sealing gasket 14' in contact with the metallic cylinder 1'.

In FIG. 7, the stop piece 8" of electrically insulated stop rod 3" and the piston 2" also serve as the two contacts of the electrical switch and, in addition, the floating piston 2" is provided with a sleeve 59 adapted to slidably fit over the cylindrical stop piece 8" at the end of the piston stroke.

The stop piece 8" has a central bore 8a opening at the free end of the stop piece and in communication with a side passage 8b. This arrangement forms a shock absorber to gradually slow down the piston at the end of its stroke, the liquid emprisoned within the sleeve by the stop piece 8" slowly discharging through the bore 8a and passage 8b. This arrangement is naturally provided on both sides of the cylinder.

The measuring and dispensing apparatus of the last embodiment, shown in FIGS. 8 and 9, shows a modified main cylinder and also additional cylinders for dispensing two or more separate liquids in exactly proportional volumes.

The measuring cylinder 1' is similar to cylinder 1 of the first embodiment, being provided with head plates 9' and a transverse plate 12'. These plates have a similar liquid circuit provided by the bores 49, 48. These bores are in communication with the bores 47, 47' of the valve body 13 of the four-way valve 4 of the first embodiment, this four-way valve being the same as the first embodiment and being actuated by an electric motor 5 and transmission 6 and the sprockets 29, 27 and chain 28.

Instead of a free piston, a piston 60 is secured to a piston rod 61 freely slidable through bores of the head plates 9'. Each end of the piston rod is provided with a stop finger 62 adapted to abut against a stop piece 8 at the exterior of the cylinder. This stop piece is adapted to actuate an electrical switch 7 within stop rod 3 and similar to switch 7 of FIG. 5. This stop rod 3 is held in adjusted position by a bracket 63, in turn held by a support 64 secured to the respective head plates 9'. The two switches 7, one at each end of the cylinder, are actuated upon alternate contact of the finger 62 with the respective stop pieces 8, so that the measuring and dispensing apparatus operates in the same way as in the first embodiment, except that the switches are external to the cylinder and are therefore more easily accessible for repair or the like.

In accordance with the main features of FIG. 8, the pistons of one or more measuring and dispensing cylinder assemblies can be mechanically connected to piston rod 61 to measure and dispense proportionate amounts of a like number of additional liquids. These cylinders may be of the same construction as the main cylinder and piston with their piston rod 61 secured to one another by a connecting member 61'. Cylinders and pistons of different diameters can be provided to dispense different amounts of the separte liquids for the same piston stroke.

In accordance with a further embodiment, as shown in FIG. 8, the auxiliary cylinders can be of variable volume, so as to dispense an adjusted amount of liquid for the same stroke of the piston. The cylinder 65 (see FIGS. 8 and 9) has a wall of U-shape cross-section, being closed at its upper end by a top plate 66. Both ends of the cylinder 65 are closed by head plates 67 with the intermediary of a sealing gasket 68. The head plates 67 are secured to the head pltes 9' of the main cylinder by means of a dovetailed tongue and groove arrangement 69. An adjustable partition plate 70 is fitted within the chamber 65 and can be adjusted up or down to vary the volume of the chamber by being provided with threaded studs 71 secured to the partition 70 at both ends and freely extending through the top plate 66. Compression coil spring 72 surrounds the studs 71 between the plate 66 and partition 70 so as to urge the plate downwardly. Nuts 73 are screwed on the studs and bear against the top of plate 66 to retain the partition 70 in precisely adjusted position within the cylinder 65.

A piston 74, of flexible material, is secured to a piston rod 75 which extends at both ends freely through bores of the head plates 67. The two ends of the piston rod 75 are respectively secured by the connecting member 61' to the respective ends of the main piston rod 61. Thus, the piston 74 will move back and forth along with main piston 60 and accomplish the same stroke. Piston 74 is of flexible material, such as rubber, and when seen in end view, has a Y shape, as shown in FIG. 8, with diverging legs 76, which maintain a sweeping contact with the partition plate 70. The piston in cross-section, conforms to the cross-sectional shape of a chamber formed by the cylinder 65 and closing partition 70.

It will be noted that the legs 76 can flex more or less depending on the adjusted vertical position of the partition 70, so as to remain in sweeping ands sealing contact therewith, irrespective of the position of partition 70. The liquid circuit for the auxiliary cylinder is as follows.

Liquid from a supply under pressure is admitted through inlet opening 77 of the top plate 66 into the chamber 78 defined by the top plate 66 and the movable partition 70. The latter is provided with a pair of check valves 79 at a greater distance from each other than the maximum stroke. These valves 79 allow liquid flow from the chamber 77 into the cylinder 65 but prevent reverse flow.

The liquid is discharged from either end of the cyklinder through a tube 80 having its inlet near the partition 70 and connected with an outlet bore 81 made in the head plate 67 and adapted for connection to a discharge pipe. During a stroke of the piston 76 in one direction, the liquid is admitted to the cylinder through the check valve behind the piston and is discharged through the outlet 81 forwardly of the piston.

What we claim is:

1. An apparatus for dispensing a measured volume of liquid comprising an elongated tubular body having an inside wall surface and end walls closing both ends of said body, a pair of stop rods extending through the respective end walls inwardly within said tubular body, (piston means including) a free piston movable longitudinally within said body in fluid-tight contact with said body and inside wall and having abutment surfaces at each side thereof adapted to abut the inner end of the respective stop rods upon the free piston reaching one of two limit positions, said free piston defining two measuring chambers in said body, one chamber on each of the opposite sides of said free piston and between said sides and the respective end walls, each chamber having at least one port, a source of liquid under pressure to be measured and dispensed, a liquid circuit including a control valve comprising a valve body having an inlet port connected to said source of liquid under pressure, an outlet port and two additional ports connected to said measuring chambers, respectively, said control valve further having a valve member movable within said valve body between a first position connecting said inlet port to one of said chambers and said outlet port to the other of said chambers, and a second position connecting said inlet port to said other chamber and said oulet port to said one chamber, an electric driving means to move said valve member between said two positions, and an electric supply circuit for controlling said electric driving means and including two normally open electrical switches parallel connected in series in said supply circuit and mounted at the inner ends of the respective stop rods and both spaced from the abutment surfaces of said free piston when said free piston takes a central position within said cylinder, said free piston upon reaching anyone of said two limit positions causing closing of the associated electrical switch and energization of said electric driving means to move said valve member from one to the other of its two positions thereby reversing the movement of the free piston and causing the opening of the associated switch and stopping of said electric driving means.

2. An apparatus as claimed in claim 1, wherein said stop rods are longitudinally adjustably secured to the respective end walls to adjust the stroke of said free piston.

3. An apparatus as claimed in claim 2, wherein one electrical contact of each electrical switch is formed by the respective abutment surface of said free piston, while the other electrical contact is formed by the inner end of the respective stop rods, the latter being electrically insulated from the end walls of said elongated tubular body, said free piston being in electrical contact with said body, the latter being electrically conductive and connected into said electric circuit.

4. An apparatus as claimed in claim 2, wherein each stop rod has at its inner end a stop piece mounted for limited relative movement with respect to the stop rod and adapted to abut the free piston at the end of the stroke of the latter, and said electrical switches being each mounted within the respective stop rod and closing upon movement of the stop piece, said electrical switches being electrically insulated from said tubular body, said free piston and said stop rods.

5. An apparatus as claimed in claim 1, wherein said control valve is a four-way valve and said valve body has a tapered bore, said valve member consisting of a tapered valve stem fitted within said bore, said valve body having four passages at right angles to each other in the same plane and opening within said valve body bore, said valve member having opposite peripheral grooves for establishing communication between said passages two by two, said valve stem being fitted with an O-ring below and above said passages and further with longitudinally extending gasket members adapted to separate the high pressure feeding liquid circuit from the low pressure liquid discharging circuit and wherein said valve body has a closed chamber in which the larger end of said valve stem is exposed, and further including a by-pass passage in said valve body communicating said outlet port with said chamber, whereby liquid pressure in said outlet port is exerted on said valve stem to make the valve more liquid-tight and when there is no liquid in said outlet port, the valve stem is not subjected to said liquid pressure and can rotate more freely.

6. An apparatus for dispensing measured volumes of a first and a second liquid comprising first and second parallel elongated tubular bodies secured to each other, each having an inside wall surface and end walls closing both ends of the respective bodies, piston means movable longitudinally within each body, each piston means including a piston in fluid-tight contact with the respective body and inside wall thereof and defining two measuring chambers in the respective bodies, one chamber on each of the opposite sides of said piston and between said sides and the respective end walls, each chamber of said first body having at least one port, a source of said first liquid under pressure, a liquid circuit for said first liquid including a control valve comprising a valve body having an inlet port connected to said source of said first liquid under pressure, an outlet port and two additional ports connected to said measuring chambers of said first body respectively, said control valve further having a valve member movable within said valve body between a first position connecting said inlet port to one of said chambers of said first body and said outlet port to the other of said chambers of said first body and a second position connecting said inlet port to said other chamber of said first body and said outlet port to said one chamber of said first body, an electric driving means to move said valve member between said two positions, an electric supply circuit for controlling said electric driving means and including two normally open electrical switches, parallel connected in series in said supply circuit and mounted outside said first body at the ends thereof and in the path of said piston means of said first body and both said switches spaced from the ends of said piston means when said piston means takes a central position within said first tubular body, said piston means in said first tubular body upon abutting any one of said electrical switches, causing stopping of the movement of said piston means, closing of said one electrical switch and energization of said electric driving means to move said valve member from one to the other of its two positions, thereby reversing the movement of the piston means and causing the opening of the last named switch and stopping of said electric driving means, said piston means associated with each of said first and second tubular bodies, each having a piston rod extending through the respective end walls of said first and second tubular bodies respectively, the piston rod of the piston means located in said second tubular body being fixed to the piston rod of the piston means located in said first tubular body to move in unison with aid last named piston rod, a separate liquid circuit for said second tubular body including an inlet port and an outlet port for each chamber of said second tubular body on each side of its piston, each inlet port of said second tubular body having a check valve to allow entrance of the liquid within the chamber being under suction by the piston while preventing exit of the liquid in the chamber being subjected to discharge, and wherein said second tubular body is of variable volume being formed with a U-shaped cross-section and an adjustable partition adjustably secured within said second body to define a chamber of variable volume, the piston within said chamber having a configuration including diverging wings in sweeping contact with the adjustable partition to remain in sealing contact with the same, despite the varied adjusted positions of said partition.

* * * * *